June 17, 1930.   L. W. BROWNE   1,764,825
REMOTE CONTROL STRUCTURE FOR VALVES
Filed Sept. 27, 1927
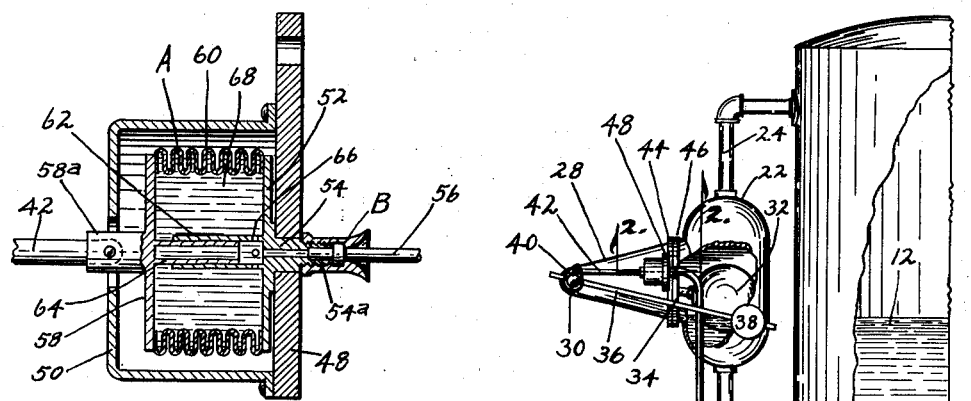
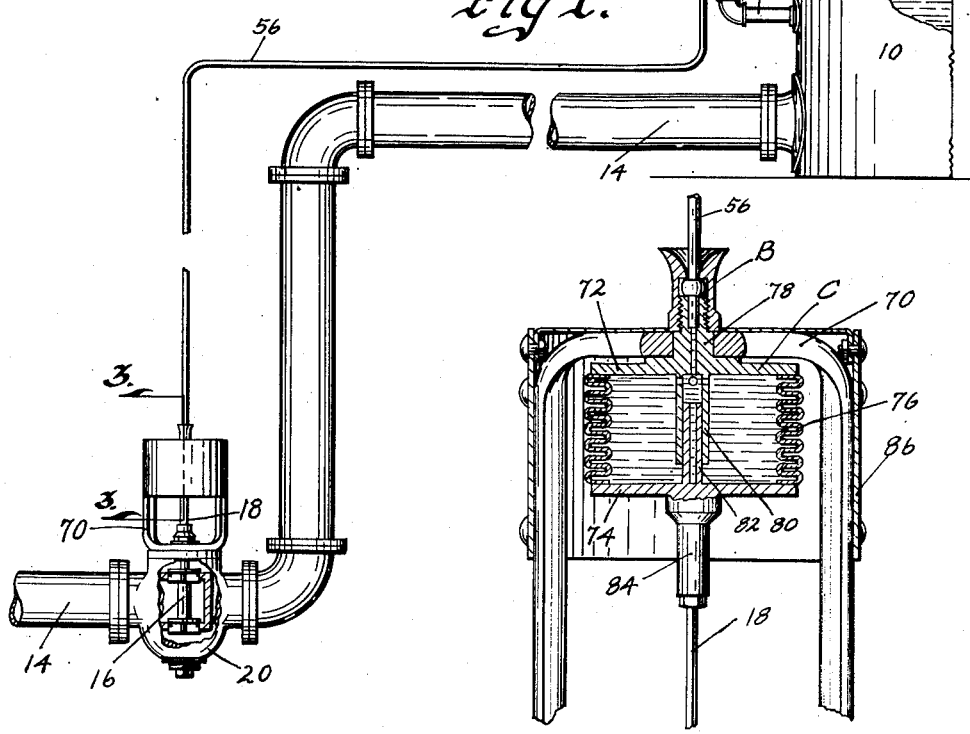
Witness
C. J. Dykstra
Inventor
Lyle W. Browne
by Bair & Freeman Attorneys Patented June 17, 1930

1,764,825

UNITED STATES PATENT OFFICE

LYLE W. BROWNE, OF MARSHALLTOWN, IOWA, ASSIGNOR TO THE FISHER GOVERNOR COMPANY, INC., OF MARSHALLTOWN, IOWA

REMOTE-CONTROL STRUCTURE FOR VALVES

Application filed September 27, 1927. Serial No. 222,329.

The object of my invention is to provide a remote control structure for valves employing a float actuated member for contracting and expanding a bellows containing liquid and connected by a tube with another bellows containing liquid, from which second bellows the valve is actuated.

With this and other objects in view, my invention consists in the construction, arrangement and combination of the parts of my remote control structure for valves, whereby the objects contemplated are attained, as hereinafter more fully set forth, pointed out in my claims, and illustrated in the accompanying drawings, in which:

Figure 1 is a side elevation of an installation embodying my invention, parts being shown in section and parts being broken away.

Figure 2 is a detail, sectional view taken on the line 2—2 of Figure 1; and

Figure 3 is a similar view taken on the line 3—3 of Figure 1.

In the accompanying drawings, I have used the reference numeral 10 to indicate that portion of a tank shown. The tank contains a liquid 12, which may be oil or otherwise.

Extending away from the lower part of the tank is a fluid conducting pipe 14 in which is interposed a valve 16 having a stem 18 projecting from the valve casing 20.

Supported on the tank is a float casing 22, the interior of which is connected with the tank 10 above and below the casing by means of suitable pipes 24 and 26.

Supported on and extending away from the float casing 22 is a hollow cone-shaped float arm receiving member 28. Suitably mounted in the wall or walls of the member 28 is a shaft 30, which extends from the interior of the member 28 to a point outside thereof.

In the float casing 22 is a suitable float 32, having the arm 34 fixed to the shaft 30 inside the member 28. As the liquid in the float casing rises or lowers, the float is raised or lowered.

Fixed to the shaft 30 outside the member 28 is a rod 36 on which is a counterweight 38.

Fixed to the shaft 30 is a short arm 40 to which is pivoted a link or rod 42.

Supported for instance on the flange 44 of the member 28, which is bolted to the flange 46 of the member 22, is a plate or bracket 48. Secured to the plate or bracket 48 is a casing 50, best shown perhaps in Figure 2.

Received within the casing 50 is a liquid containing bellows, indicated generally at A, comprising a base member 52, having projecting therefrom a tubular extension 54, the outer end of which is reduced and screwthreaded as at $54^a$. The member 54 projects through the plate 48.

The member 54 has a bore extending therethrough, which is enlarged at its outer portion to receive the end of a liquid conducting pipe or tube 56. The pipe 56 is secured to the reduced portion $54^a$ of the extension 54 by means of a compression fitting, indicated generally at B in Figure 2.

The bellows A has what may be called a top member 58 spaced from the base 52 and connected therewith by an annular, corrugated expansible wall 60.

Extending inwardly from around the bore of the extension 54 and projecting from the base 52 is a tubular member 62. Extending inwardly from the top member 58 is a smaller tubular member 64, slidably received in the tubular extension 62 and with it forming a suitable guide for the bellows.

In the tubular guide member 62 adjacent to the base 52 are suitable holes 66.

When the bellows is contracted, the liquid 68 therein is forced outwardly through the member 54 and into and through the tube 56.

Mounted on the valve casing 20 above mentioned is the central portion of a rectangular yoke or supporting bracket 70. A second bellows indicated generally at C is supported on the upper portion of the yoke 70. The second bellows has the base 72 similar in construction to the base 52, a top 74 similar to the top 58, the connecting wall 76 similar to the wall 60, an extension 78 similar to the extension 54, and tubes 80 and 82 similar to the tubes 62 and 64.

The tube 56 is connected with the extension 78 by a compression fitting B similar to that already described.

Extending from the top 74 of the bellows C is a post 84, to which the valve stem 18 is adjustably connected.

A protecting casing 86 is provided for the bellows C.

In the practical operation of my improved remote control for valves, it will be seen that when the float 32 rises or lowers, the shaft 30 will be rocked for reciprocating the member 42 in one direction or the other.

The member 42 is pivoted to a post 58ª on the top 58, and the reciprocation of the member 42 either contracts the bellows A, thus forcing the liquid 68 out of that bellows and toward the bellows C or expands the bellows A, thus drawing the liquid into the bellows A and reducing the amount of liquid in the bellows C.

Thus the expansion and contraction of the bellows A results in the contraction and expansion of the bellows C. The contraction and expansion of the bellows C reciprocates the valve stem 18 for thus automatically controlling the valve 16 for allowing liquid, in excess of a given level, to either flow, or be drawn, from the tank 10. In an installation where it is desired to supply fluid to the tank 10 and keep it at a predetermined level, the arm 40 may be reversed for contracting the bellows A when the float 38 rises, and thus closing the valve 16.

The operation of my remote control structure is very simple.

By simply varying the length of the tube 56, a structure of this kind can be installed under a great variety of working conditions.

I claim as my invention:

1. In a structure of the class described, the combination of a float controlled shaft with a link pivoted thereto, a fluid holding bellows having one end member pivoted to said link and the other end member fixedly mounted, a tube communicating with the interior of said bellows, a valve structure, a second bellows, means for supporting one end of said second bellows fixedly from said valve structure, said valve structure having a valve and projecting stem, said stem being operatively connected with the other end of the second bellows, said tube being arranged in communication with the interior of the second bellows.

2. In a structure of the class described, the combination of a valve structure having a casing and a valve and a projecting stem with a float actuated shaft, and means interposed between said shaft and said valve stem for operating the valve stem from the shaft, said means comprising a fluid holding bellows fixedly mounted at one end and having its other end operatively connected with said shaft, a second bellows fixedly mounted at one end and having its other end operatively connected with said stem, and a tube connecting the interior of said bellows with each other, whereby the contraction or expansion of one bellows serves to cause expansion or contraction of the other bellows.

3. In a device of the class described, a float cage, a shaft projecting therefrom, a float in said cage having an arm fixed to said shaft, an arm on said shaft outside the float cage, a link pivoted to said arm, a liquid receiving bellows having one end fixedly mounted and the other end operatively connected with said link, a valve casing, a valve therein having a stem projecting through said casing, a supporting yoke on said casing, a liquid receiving bellows having one end fixed to said yoke and the other end operatively connected with said stem, and a tube connecting the interiors of said bellows.

Des Moines, Iowa, September 21, 1927.

LYLE W. BROWNE.